United States Patent Office 3,541,438
Patented Nov. 17, 1970

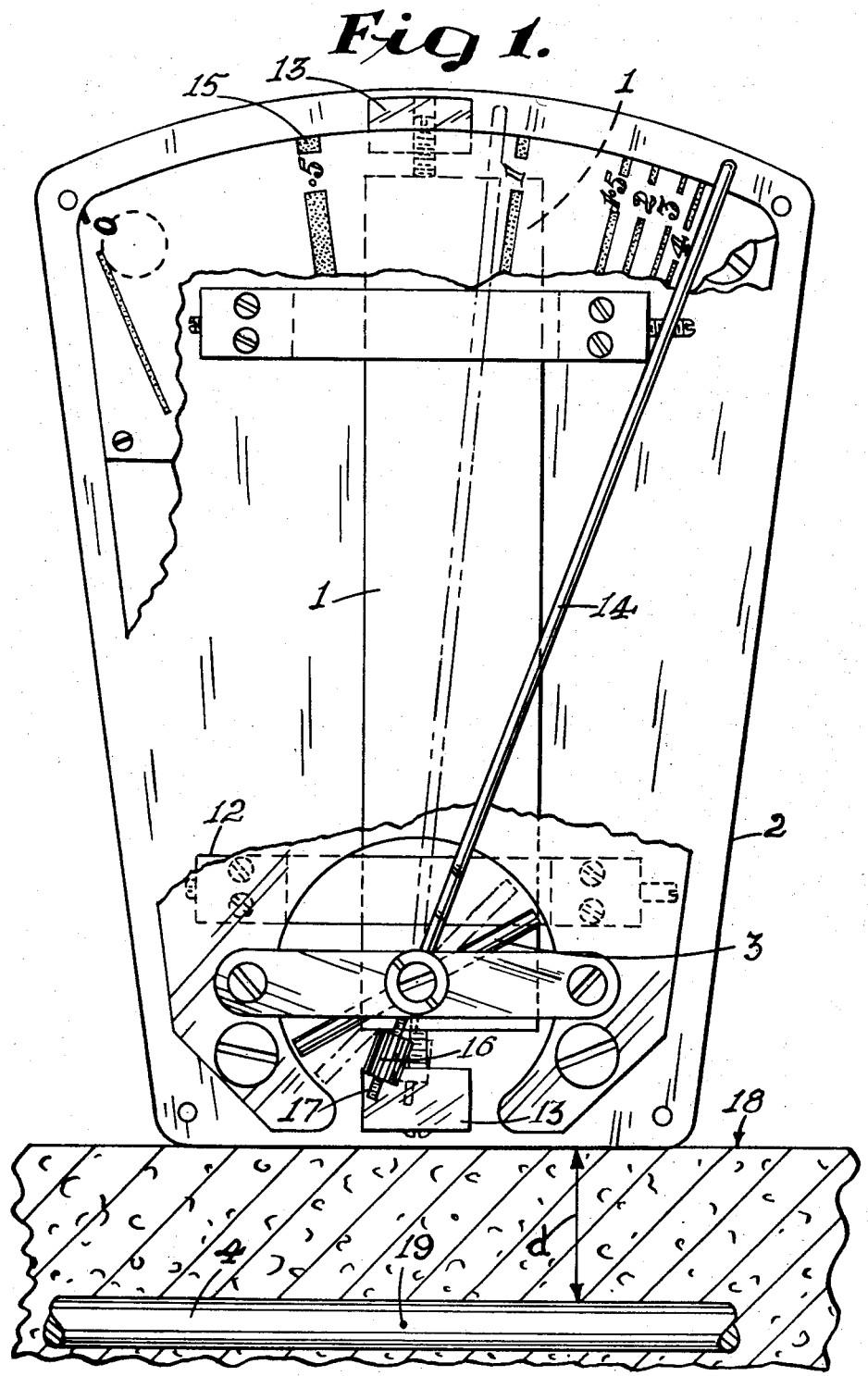

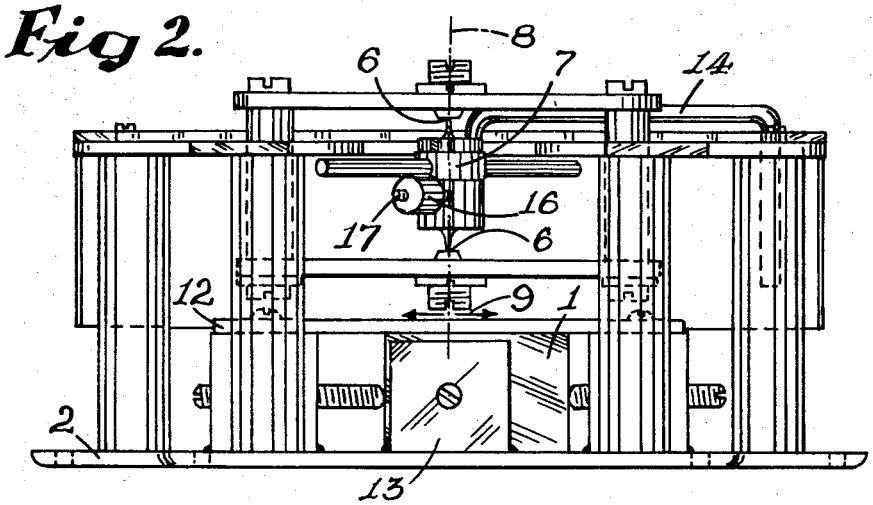
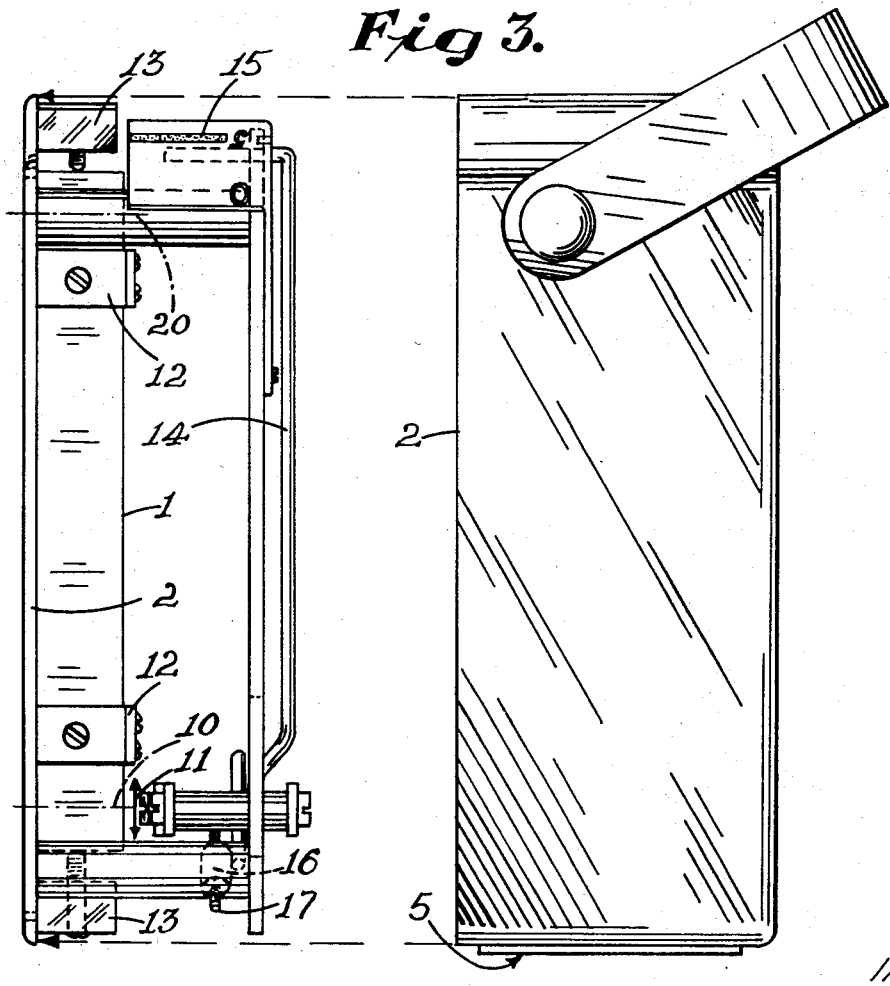

3,541,438
DEVICE INCLUDING A ROTATING MAGNET POSITIONED RELATIVE TO ANOTHER MAGNET FOR INDICATING THE PRESENCE OF MAGNETIZABLE ELEMENTS
Trevor Lloyd Wadley, Kingsburgh, South Coast, Natal, Republic of South Africa, assignor to Racal-S.M.D. Electronics (Proprietary) Limited, Pretoria, Transvaal, Republic of South Africa
Filed Feb. 6, 1968, Ser. No. 703,293
Claims priority, application Republic of South Africa, Feb. 16, 1967, 67/908
Int. Cl. G01r 33/00
U.S. Cl. 324—67
9 Claims

ABSTRACT OF THE DISCLOSURE

A magnetic device for determining the presence and location of metallic magnetizable elements behind a wall. The device operates on the principle of a large magnet inducing a magnetic pole in the magnetizable element, and causing this induced pole to react with a pivotally mounted smaller magnet. The position of the smaller magnet will give an indication of the presence and position of the magnetizable element. The second magnet rotates in a plane lying at an angle to the direction of a flux line emanating from the first magnet and passing through the midpoint of the second magnet, which arrangement minimizes interference with the smaller magnet by the field of the larger magnet. A small component of the field of the larger magnet is intentionally caused to interfere with the smaller magnet so as to provide a restoring force to the smaller magnet.

---

This invention relates to magnetic detecting devices for determining the presence and location of magnetizable elements, such as steel reinforcing bars or pipes within concrete structures and the like. The presence and location of these elements is determined by the effect of the magnetizable elements on the field of a magnet or magnets in the detecting device.

In an elementary known magnetic device for this purpose a single magnet is mounted for movement proportional to the strength of the magnetic pole or poles induced in a magnetizable element by the field of the magnet. In this arrangement the magnet is associated with a pointer and graduated scale to provide an indication of the presence and location of the magnetizable element. A hairspring usually provides a restoring force in a direction opposite to that in which the magnet is caused to rotate when brought into proximity of a magnetizable element. This device, however, is inefficient since in order to be sensitive the magnet must be small and delicately mounted whereas to induce a strong pole in the magnetizable element it should be powerful and thus relatively large.

This problem has been overcome in another known device in which a large permanent magnet is mounted rigidly within a casing of the device and induces a pole in the magnetizable element. The induced pole then reacts with a second magnet which is smaller than the first and which is pivotally mounted to rotate in accordance with the strength of the pole induced in the magnetizable element. A device of this kind which is known employs a magnetic pole piece (which is equivalent to the second magnet referred to above) which lies in the field of the large magnet (which is equivalent to the first magnet referred to above), the arrangement being such that the large magnet in addition to inducing a pole in the magnetizable element induces poles in the pole piece, thus magnetizing the pole piece. The restoring force in this device is provided by the forces which result from the interaction between the induced poles in the pole pieces and the poles of the large magnet.

A difficulty of this device, however, is that it is necessary to place the pole piece relatively near to one pole of the large magnet so that the induced poles induced in the pole piece are strong. However, with this arrangement, the restoring forces are correspondingly as strong as the indicating forces with the result that the pointer movement is restricted. Alternatively, by spacing the pole piece further from the pole of the large magnet, the poles induced in the pole piece are smaller with the consequent reduction of the magnitude of the restoring forces. The drawback of this latter step is that, although greater movement is obtained, the activating forces are also weakened and frictional trouble is encountered.

As a solution to these problems another known device has been developed in which the pole piece is pivotally mounted close to one pole of the magnet, but overhangs its pivot in such a manner that the restoring forces on the two poles induced in the pole piece almost neutralize each other. This is achieved by mounting the pole piece on its pivot further from the large magnet than the pivot itself. However, the disadvantage of this arrangement is that the pole piece is near instability in the field of the large magnet, and accordingly the latter must be critically shaped to preserve stability and provide the required graduated scale shape. With this arrangement large scale deflections may be obtained, but the forces are still too weak to overcome frictional troubles. Further, the scale is difficult to determine.

It is an object of this invention to overcome, or at least minimise, the difficulties enumerated above, and to provide a detecting device which has an adequate range of indication, relatively strong indicating forces, and does not require critical shaping of the magnetic field.

According to the invention, a device for indicating the presence of a magnetizable element, includes a first magnet adapted to induce a pole in the magnetizable element when brought into the proximity of the latter; a second magnet pivotally mounted for rotation in a plane lying at an angle to the direction of a flux line emanating from the first magnet and passing through the midpoint of the second magnet, rotational movement of the second magnet being dependent on the proximity of the latter to the pole induced in the magnetizable element; and an indicator movable with the second magnet.

For the purpose of this specification the term "midpoint" of the magnet is used to signify the midpoint of a straight line extending between the north and south poles of the second magnet. The use of the term "midpoint" simply serves the purpose of providing a reference by which the plane of rotation of the second magnet may be specified relative to the flux line emanating from the first magnet. The flux lines emanating from the first magnet which are of concern are those lines which exist in the absence of a magnetizable element or a second magnet.

In stating that the plane of rotation of the second magnet lies at an angle to the direction of a flux line emanating from the first magnet, it is meant that an angle other than a zero angle is involved.

It is in this feature, in particular, that the decided advantages of the applicant's detecting device are apparent over presently known detecting arrangements. In the prior art discussed above the angle between the flux lines emanating from the main or large magnet and the rotational plane of the second pole piece or smaller magnet is substantially zero, and it is here that drawbacks in the known arrangements arise.

For the sake of sensitivity it is preferred to mount the second magnet so that its plane of rotation lies at an angle in the range from 45° to 90° to a flux line emanating from the first magnet and passing through the midpoint of the second magnet. As the angle between the plane of rotation and the direction of the flux line passing through the midpoint of the second magnet diverges from 90°, the sensitivity of the device decreases and the maximum permissible deviation from 90° would depend on the intended application and sensitivity of the device. An angle of between 80° and 85° has been found suitable in most applications of the device.

Preferably, both the first and second magnets are permanent magnets.

Preferably also, both the first and second magnets are bar magnets.

Further according to the invention a restoring influence is provided for rotationally biasing the second magnet in a direction opposite to that in which it is caused to rotate when brought into the proximity of a magnetizable element.

The restoring influence may be exerted by a hairspring.

Alternatively, the restoring influence may be exerted by a component of the magnetic flux of the first magnet acting substantially in the rotational plane of the second magnet. This may be achieved by displacement of the rotational plane of the second magnet to a non-right-angular position relative to the flux line passing through the second magnet midpoint.

In order to illustrate the invention an example is described below with reference to the accompanying drawings in which, FIG. 1 is a plan view with parts broken away, of a detecting device in accordance with the invention, the device being shown adjacent a surface within which it is required to determine the presence of a magnetizable element, FIG. 2 is a side elevation of the device with the casing removed, and FIG. 3 is a different side elevation of the device with the casing removed.

A detecting device consists in a first permanent bar magnet 1 which is mounted rigidly in a casing 2 and a second bar magnet 3 which is pivotally mounted in the casing. The first magnet 1, which is relatively large compared with the second magnet 3, is adapted to induce a pole in a magnetizable element 4 whose presence and position is to be determined. The second magnet 3, which is made of a light ceramic material, is arranged to respond to the interaction between the induced pole in the magnetizable element 4 and its own poles.

The first magnet 1 is mounted ni the casing 2 so that it is perpendicular to one side wall of the casing, this side wall 5 forming the datum from which measurements can be taken. The second magnet 3 is mounted pivotally at 6 for rotation in a plane lying at an angle to the direction of a flux line emanating from the first magnet 1 and passing through the midpoint 7 of the second magnet 3. The pivotal axis 8 of the second magnet 3 conveniently passes through the midpoint 7 of the line joining the poles of the second magnet in such a way that the second magnet 3 rotates in a plane at substantially right angles to the pivotal axis 8. The plane of rotation of the second magnet 3 is made at right angles to a flux line emanating from the first magnet 1 by locating the second magnet 3 above a pole of the first magnet 1 such that the plane of rotation is parallel to the line joining the poles of the first magnet 1.

A restoring influence is provided for biasing the second magnet 3 in a direction opposite to that in which it is caused to rotate as a result of the interaction between the induced pole in the magnetizable element 4 and the poles in the second magnet 3 itself. This restoring force is developed by introducing a component of the magnetic flux of the first magnet 1 into the plane in which the second magnet 3 rotates. This may be achieved by tilting the plane of rotation of the second magnet 3 so that it is no longer at right angles to the flux line emanating from the first magnet 1. The degree of displacement will determine the magnitude of the restoring forces.

By adjusting the relative position of the pivotal axis 8 of the second magnet 3 in a direction indicated by arrow 9 (FIG. 2) with respect to the pole zone 10 of the first magnet 1 a variation of the sensitivity of the device may be obtained. Likewise by adjusting the relative position of the pivotal axis 8 of the second magnet 3 in a direction indicated by arrow 11 (FIG. 3) with respect to the pole zone 10 of the first magnet 1 a variation of the zero and infinity readings may be obtained. These adjustments are by virtue of the variation of the magnitude of the restoring force, and hence flux lines, acting in the rotational plane of the magnet 3.

In the particular example of the invention being described, the first magnet 1 is variably located in position relative to the second magnet 3. Clamping arrangements 12 provide for movement in the direction of arrow 9 of the first magnet 1 and clamping arrangements 13 provide for movement in the direction of arrow 11 of the first magnet.

An indication of the presence and position of the magnetizable element 4 is achieved by providing an indicator or pointer 14 being associated with a graduated scale 15 in the casing 2. With this arrangement, therefore, as the second magnet 3 rotates the pointer 14 will move over the graduated scale 15 and provide an indication of the presence and position of the magnetizable element 4.

A weighted member 16 is provided on the side of the pivotal axis 8 which is remote from the indicator or pointer 14, the member 16 acting to counter-balance the pointer 14. Thread means 17 is provided to adjust the position of the counter-balance member 16 as required.

In operation of the detecting device the side wall 5 of the casing 2 which forms the datum is positioned adjacent the surface 18 within which it is desired to determine the presence and position of a magnetizable element 4. In this position the first magnet 1 is perpendicular to the surface 18, and the pole zone 10 of the first magnet 1 is located close to the magnetizable element 4. In this manner a pole zone as indicated by numeral 19 may be induced in the magnetizable element 4 in a position opposite the pole zone 10 of the first magnet 1, the strength of the induced pole 19 being dependent on the distance of the magnetizable element 4, from the pole 10 of the first magnet 1.

The induced pole 19 in the magnetizable element 4 interacts with the pivoted magnet 3 in such a way that the closer the magnetizable element 4 to the casing 2, the greater the interaction between the second magnet 3 and the induced pole 19. With this arrangement, therefore, the closer the magnetizable element 4 to the datum surface 5 the more the axis of the pivoted magnet 3 will be drawn into the direction parallel to the axis of the first magnet 1. The further the distance the less the interaction between the second magnet 3 and the induced pole 19 and the more transverse the axis of the second magnet 3 will be to the axis of the first magnet 1.

The axis of a magnet may be defined for the purpose of this specification to be the line joining the pole zones of the magnet.

As the pointer 15 is rigidly connected with the second magnet 3, as the latter rotates, the pointer 14 moves across the graduated scale 15 with which it is associated and a measure of the distance $d$ of the magnetizable element 4 from the datum 5 will be obtained.

It will be appreciated that the second magnet 3 is substantially independent of the poles 10 and 20 of the first magnet 1 except in so far as these poles provide a flux in the plane of rotation of the second magnet 3 to react with the second magnet 3 and thereby provide restoring forces for the second magnet 3.

Many more examples of the invention exist each differing from the other in matters of detail only but in no way departing from the scope of the invention as set out in the appended claims. For instance, the first magnet 1 may be located so that its axis is substantially parallel to the side 5 of the casing 2 forming the datum of measurements. In this arrangement the reading scale 15 may require different graduation.

In another arrangement of the invention the restoring forces may be provided mechanically by a hairspring instead of by creating a magnetic couple.

In a further modification of the invention the second magnet may be placed near the midpoint of the first magnet 1, where the midpoint of the first magnet 1 is half the length of the line joining the poles 10 and 20 of the first magnet 1. In this case, however, for the rotational plane of the second magnet 3 to be at right angles to the flux line emanating from the first magnet 1, the plane will be at right angles to the line joining the poles 10 and 20 of the first magnet 1. In the above described example this plane was substantially parallel to the line joining the poles 10 and 20 of the first magnet 1.

It should be appreciated that the invention includes within its scope a plane of rotation for the second magnet other than at right angles to the flux line of the first magnet. Experiment has shown, however, that this angle should not be zero but close to right-angular if good sensitivity of readings is to be obtained.

I claim:

1. A device for indicating the presence of a magnetizable element including a first magnet operative to induce a pole in a magnetizable element when brought into the proximity of the latter; a second magnet pivotally mounted adjacent the first magnet for rotation of its magnetic axis relative to the first magnet in a plane lying at an angle to the direction at the midpoint of the second magnet of the flux line which emanates from the first magnet and which passes through the midpoint of the second magnet, rotational movement of the second magnet being dependent on the proximity of the latter to the pole induced in the magnetizable element; and an indicator movable with the second magnet.

2. A device as claimed in claim 1 wherein the plane of rotation of the second magnet lies at an angle in the range from 45° to 90° to the flux line emanating from the first magnet and passing through the midpoint of the second magnet.

3. A device as claimed in claim 2 wherein the rotational plane of the second magnet lies at substantially right angles to the flux line emanating from the first magnet and passing through the second magnet midpoint.

4. A device for indicating the presence of a magnetizable element including a first magnet operative to induce a pole in a magnetizable element when brought into the proximity of the latter; a second magnet pivotally mounted adjacent the first magnet for rotation of its magnetic axis relative to the first magnet in a plane lying at an angle to the direction at the midpoint of the second magnet of the flux line which emanates from the first magnet and which passes through the midpoint of the second magnet, rotational movement of the second magnet being dependent on the proximity of the latter to the pole induced in the magnetizable element; an indicator movable with the second magnet; and means rotationally biasing the second magnet in a direction opposite to that in which it is caused to rotate when brought into the proximity of the magnetizable element.

5. A device as claimed in claim 4 wherein the plane of rotation of the second magnet lies at an angle in the range from 45° to 90° to the flux line emanating from the first magnet and passing through the midpoint of the second magnet.

6. A device as claimed in claim 4 wherein the restoring force is exerted by a component of the magnetic flux of the first magnet acting substantially in the rotational plane of the second magnet.

7. A device as claimed in claim 5 wherein the rotational plane of the second magnet lies at substantially right angles to the flux line emanating from the first magnet and passing through the second magnet midpoint.

8. A device as claimed in claim 6 wherein the axis of rotation of the second magnet passes through the zone of a pole of the first magnet and is disposed at right angles to the axis of the first magnet joining the poles of the first magnet.

9. A device as claimed in claim 7 wherein the magnets are permanent bar magnets.

References Cited

UNITED STATES PATENTS

| | | | |
|---|---|---|---|
| 468,020 | 2/1892 | Wood | 324—133 XR |
| 1,737,303 | 11/1929 | Eshbaugh | 324—146 |
| 1,761,917 | 6/1930 | Helgeby | 324—146 |
| 2,284,045 | 5/1942 | Connolly | 324—146 |
| 2,469,476 | 5/1949 | Sellars | 324—34 |
| 2,484,567 | 10/1949 | Hoare | 324—146 |
| 2,817,816 | 12/1957 | Medlar | 324—151 XR |
| 2,903,645 | 9/1959 | Wright et al. | 324—34 |
| 2,933,679 | 4/1960 | Bray | 324—67 XR |
| 3,025,512 | 3/1962 | Bloechl | 340—373 |
| 3,334,420 | 8/1967 | Stockton | 33—223 |

GERARD R. STRECKER, Primary Examiner

U.S. Cl. X.R.

324—41